United States Patent
Pakhchyan et al.

(10) Patent No.: US 8,087,793 B2
(45) Date of Patent: Jan. 3, 2012

(54) BACK-LIGHT ASSEMBLY

(75) Inventors: Edward Pakhchyan, Burbank, CA (US); Haik Mesropian, Glendale, CA (US); Syuzi Pakhchyan, Glendale, CA (US)

(73) Assignee: Edward Pakhchyan

( * ) Notice: Subject to any disclaimer, the term of this patent is extended or adjusted under 35 U.S.C. 154(b) by 550 days.

(21) Appl. No.: 11/980,965

(22) Filed: Oct. 30, 2007

(65) Prior Publication Data
US 2009/0109705 A1 Apr. 30, 2009

(51) Int. Cl.
*G02F 1/1335* (2006.01)
*F21V 5/02* (2006.01)

(52) U.S. Cl. ............... 362/97.3; 362/97.1; 362/339

(58) Field of Classification Search ............ 362/606, 362/610, 612, 613, 614, 619, 620, 618, 626, 362/339, 97.1, 97.3; 349/56–64
See application file for complete search history.

(56) References Cited

U.S. PATENT DOCUMENTS

| | | | |
|---|---|---|---|
| 4,528,617 A | 7/1985 | Blackington | |
| 5,453,855 A | 9/1995 | Nakamura et al. | |
| 5,485,291 A | 1/1996 | Qiao et al. | |
| 5,577,493 A * | 11/1996 | Parkyn et al. | 126/699 |
| 5,645,337 A | 7/1997 | Gleckman | |
| 5,986,728 A * | 11/1999 | Bernard | 349/68 |
| 6,007,209 A * | 12/1999 | Pelka | 362/30 |
| 6,130,730 A * | 10/2000 | Jannson et al. | 349/65 |
| 6,241,358 B1 | 6/2001 | Higuchi et al. | |
| 6,285,426 B1 * | 9/2001 | Akins et al. | 349/114 |
| 6,331,915 B1 * | 12/2001 | Myers | 359/599 |
| 6,464,367 B2 * | 10/2002 | Ito et al. | 362/613 |
| 6,469,755 B1 | 10/2002 | Adachi et al. | |
| 6,527,410 B2 | 3/2003 | Yamaguchi | |
| 6,650,822 B1 | 11/2003 | Zhou | |
| 6,927,812 B2 | 8/2005 | Cho | |
| 7,142,768 B2 * | 11/2006 | Tseng | 385/146 |
| 7,204,632 B2 * | 4/2007 | Chen | 362/613 |
| 7,338,184 B2 * | 3/2008 | Chen et al. | 362/246 |
| 7,448,775 B2 * | 11/2008 | Parker et al. | 362/331 |
| 7,578,607 B2 * | 8/2009 | Yamashita et al. | 362/339 |
| 7,661,862 B2 * | 2/2010 | Lee et al. | 362/559 |
| 7,784,954 B1 * | 8/2010 | Coleman | 362/19 |
| 2005/0180167 A1 | 8/2005 | Hoelen et al. | |
| 2008/0008434 A1* | 1/2008 | Lee et al. | 385/129 |

FOREIGN PATENT DOCUMENTS

JP 2002352611 * 6/2002

* cited by examiner

*Primary Examiner* — Peggy A. Neils

(57) ABSTRACT

A back-light assembly for uniformly illuminating large area displays. The back-light assembly includes a uniformly thin waveguide, a reflector and a plurality of light sources evenly distributed along the display area between the waveguide and the reflector. Prismatic facets are provided along the lower surface of the waveguide for effectively coupling light emitted from light sources into the waveguide.

19 Claims, 3 Drawing Sheets

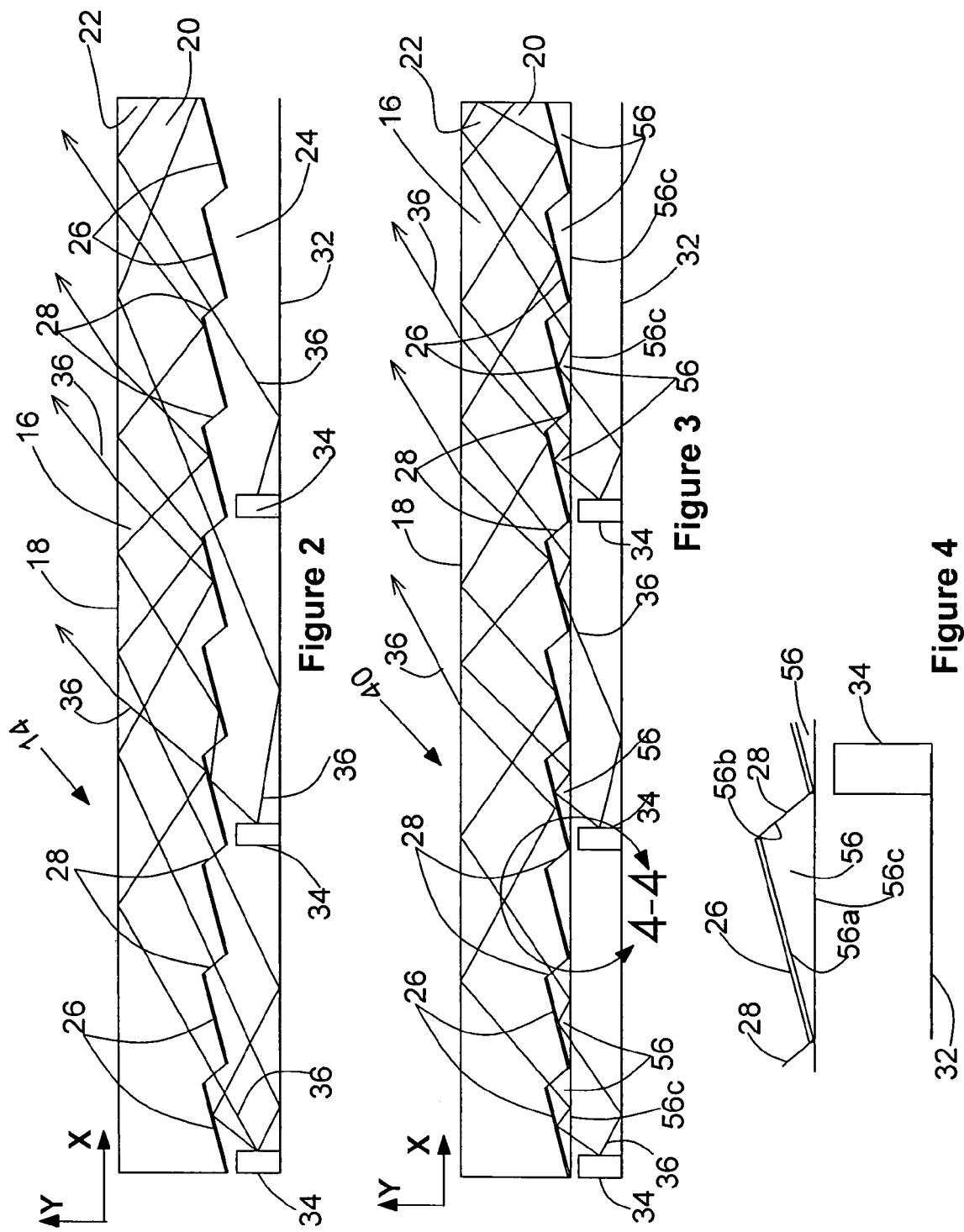

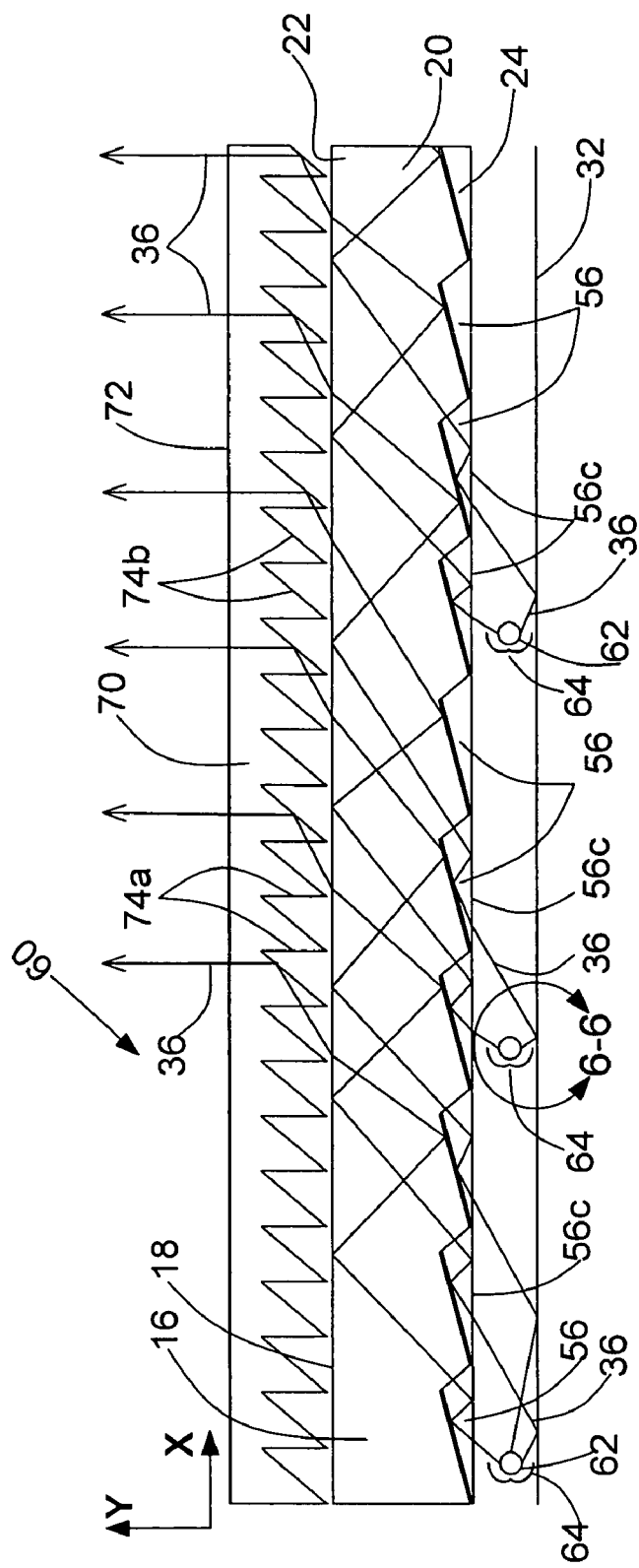
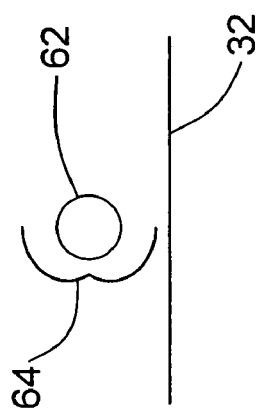
Figure 5
Figure 6

BACK-LIGHT ASSEMBLY

BACKGROUND OF THE INVENTION

1. Field of the Invention

The present invention relates generally to back-light systems for uniform illumination of large area displays. More particularly the invention concerns collimating back-light systems for displays such as liquid crystals displays and micro-electromechanical light valve displays.

2. Discussion of the Prior Art

Back-light assemblies provide a planar light source for transmissive displays. More common light sources used in display back-lighting are cold cathode fluorescent lamps and light emitting diodes.

Based on arrangements of light sources the back-light systems may be grouped either "edge-lit" or "direct-lit". In direct-lit, back-light's plural light sources are evenly distributed along the display area and each of the light sources directly illuminates a small segment of the display. In order to achieve relatively uniform illumination the light sources are placed at a great distance from the display panel. This increases the depth of the display. Additionally, diffractive optical components and diffusers are placed between the light sources and the display panel. Each light source must align with the diffractive optical components.

The only positive feature of direct-lit systems is that light sources and associated heat is evenly distributed along the display area.

Edge-lit back-light systems comprise a light source, a thin, rectangular optical waveguide, a reflector or a diffuser at the back of optical waveguide and prism films mounted between the waveguide and the display panel.

The primary limitation of edge-lit back-lights is its incapability of illuminating a large size display. Efficient light coupling and concentrated heat generated from the light sources limit the size of the edge-lit back-lights.

SUMMARY OF THE INVENTION

It is an object of the present invention to provide a homogenized, collimated and highly efficient back-light assembly for uniform illumination of large area display.

Another object of this invention is to provide a back-light assembly of the aforementioned character that exhibits an efficiency of greater than ninety-five percent.

It is another object of this invention to provide a back-light assembly that effectively overcomes the limitations of prior art direct-lit and edge-lit back-light systems.

It is another object of this invention to provide a back-light assembly that exhibits highly efficient light coupling between the light sources and the waveguide of the assembly.

It is another object of this invention to provide a back-light assembly of the character described in the preceding paragraphs that is easily scalable for displays of different sizes.

The foregoing as well as other objects of the invention will be achieved by the novel back-light assembly illustrated in the accompanying drawings and described in the specification that follows.

BRIEF DESCRIPTION OF THE DRAWINGS

FIG. 2 is a side-elevation view of the back-light system shown in FIG. 1.

FIG. 3 is a side-elevation view of an alternate form of the back-light assembly of the invention.

FIG. 4 is a greatly enlarged view of the area designated in FIG. 3 as 4-4.

FIG. 5 is a side-elevation view of still another form of back-light assembly of the invention.

FIG. 6 is a greatly enlarged view of the area designated in FIG. 5 as 6-6.

DESCRIPTION OF THE INVENTION

Figure 1:
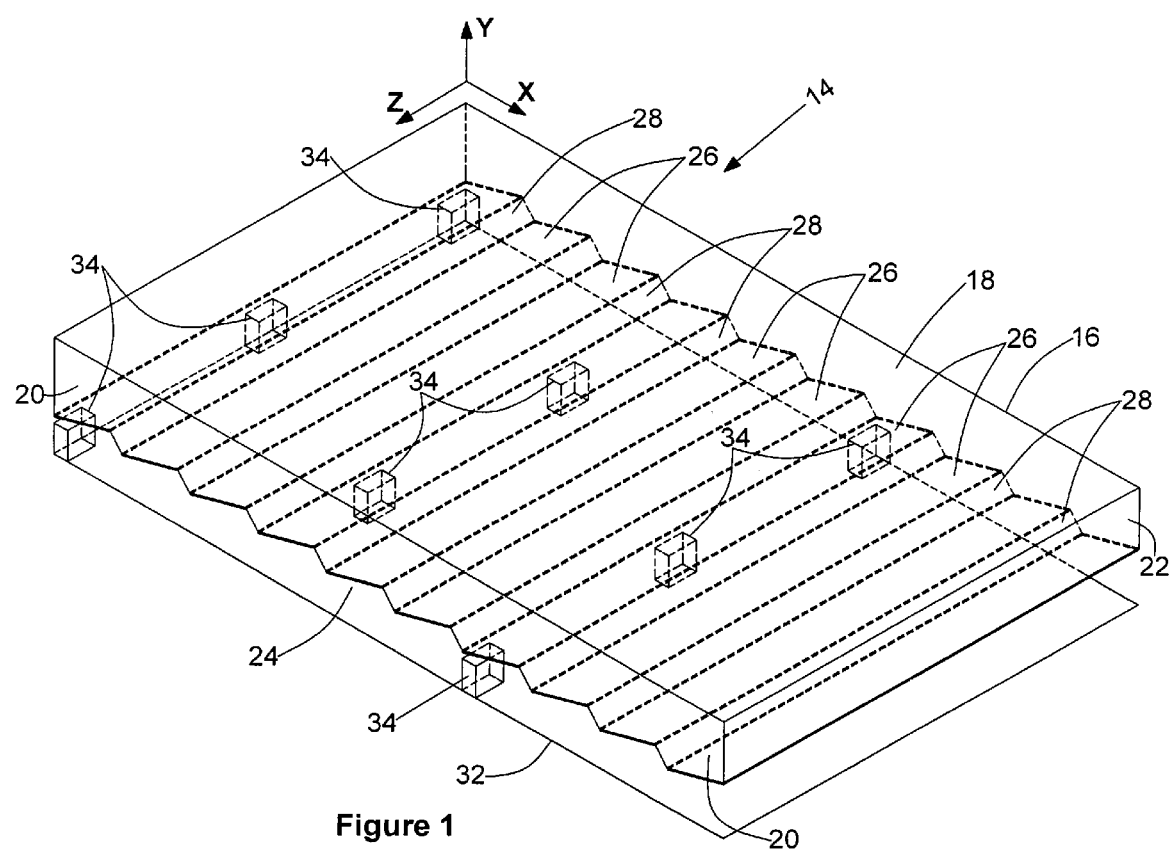
FIG. 1 is a generally perspective view of one form of the back-light assembly of the present invention.

Referring to the drawings and particularly to FIGS. 1 and 2, one form of the back-light assembly of the invention for uniformly illuminating displays such as liquid crystal displays and micro-electromechanical light valve displays is there shown and generally designated by the numeral 14. This embodiment of the invention comprises an optical waveguide 16 that has an upper, generally flat surface 18, a first side surface 20, a second side surface 22 and a specially configured lower surface 24. Surface 24 uniquely includes a plurality of upwardly inclined optically flat first facets 26 with specularly reflective coatings and a plurality of downwardly inclined optically flat second facets 28.

As best seen in FIG. 2 of the drawings, the first light-reflecting facets 26 are here inclined upwardly at an angle of between about two degrees and about fifteen degrees with respect to the plane of the upper surface 18 of the optical waveguide. The second light coupling facets 28 are inclined downwardly at a relatively steep angle of between about fifty degrees and about ninety degrees with respect to the plane of the upper surface 18. As illustrated in the drawings, alternating facets 26 and 28 form generally V-shaped grooves that extend along lower surface 24 of the waveguide between sides 20 and 22. Back-light assembly 14 also includes a light reflector panel 32 that is spaced-apart from the lower surface 24 of the optical waveguide.

Disposed between reflector panel 32 and lower surface 24 of the waveguide is a plurality of transversely spaced-apart light sources 34. In this first embodiment of the invention, light sources 34 comprise side-mounted light emitting diodes having 120 degree emission angles that emit light in the direction of X-axis (see FIG. 2). It is to be understood that light sources 34 can be of various types including cold cathode fluorescent lamps with side-mounted reflectors the character of which presently is described.

Referring to FIG. 2 of the drawings, it is to be noted that certain of the light rays 36 that are generated by the light sources 34 enter into the waveguide 16 directly from the light coupling facets 28. Additionally, depending on the angles that light rays 36 reflect from light-reflecting facets 26 and the upper surface of reflector panel 32, and also enter the waveguide 16 from the light coupling facets 28. Inside the waveguide 16 light rays 36 propagate in the X-axis direction by total internal reflections from the major upper surface 18 and light-reflecting facets 26. As indicated in FIG. 2, certain of the upwardly inclined light-reflecting facets 26 cause the light rays to exit the waveguide.

More particularly, the light rays exit the waveguide from the upper surface 18 when the light rays strike the upper surface at less than the critical angle.

Turning next to FIGS. 3 and 4, an alternate form of the back-light assembly of the invention is there illustrated and generally designated by the numeral 40. This latest embodiment is similar in some respects to the embodiment shown in FIGS. 1 and 2 of the drawings and like numbers are used in FIGS. 3 and 4 to identify like components. As indicated in FIG. 3, back-light assembly 40 here comprises an optical waveguide 16. An important feature of this second embodiment of the back-light assembly of the invention resides in the provision of a plurality of spaced-apart micro-prisms 56 that are disposed proximate lower surface 24 of the waveguide 16. As indicated in FIGS. 3 and 4 of the drawings, each micro-prism 56 has a first facet 56a optically coupled to a selected one of the light-reflecting facets 26. In a similar fashion, a second facet 56b is optically coupled to a selected one of the downwardly inclined facets 28. Each micro-prism 56 also includes a light coupling third facet 56c that interconnects the first and second facets 56a and 56b. To form the micro-prisms 56, a UV hardening liquid polymer may be filled into the V-shaped grooves with approximately the same refractive index as the waveguide 16.

Back-light assembly 40 also includes a light reflector panel 32 that is spaced-apart from the light coupling third facets 56c of the micro-prisms 56.

Disposed between reflector panel 32 and the third facets 56c is a plurality of transversely spaced-apart light sources 34. As in the first embodiment of the invention, light sources 34 comprise side-mounted light emitting diodes having 120 degree emission angles that emit light in the direction of the X-axis (see FIG. 3).

Referring to FIG. 3 of the drawings, it is to be noted that certain of the light rays 36 that are generated by the light sources 34 enter into micro-prism from the light coupling third facets 56c.

Additionally, depending on the angles that light rays 36 reflect from the upper surface of reflector panel 32 and enter into micro-prism from the light coupling third facets 56c.

Inside of the micro-prisms 56 light rays propagate in X-axis direction by total internal reflections from facets 56a and 56c and enter the waveguide 16 from facets 28.

Inside the waveguide 16 light rays 36 propagate in the X-axis direction by total internal reflections from the major upper surface 18 and light-reflecting facets 26. As indicated in FIG. 2, certain of the upwardly inclined light-reflecting facets 26 cause the light rays to exit the waveguide.

More particularly, the light rays exit the waveguide from the upper surface 18 when the light rays strike the upper surface at less than the critical angle.

Referring now to FIG. 5, still another form of the back-light assembly of the invention is there illustrated and generally designated by the 60. This latest embodiment is similar in many respects to the embodiment shown in FIGS. 3 and 4 of the drawings and like numbers are used in FIG. 5 to identify like components. The main differences between this third embodiment of the invention and that shown in FIGS. 3 and 4 reside in the provision of a different type of light source and in the addition of a prism film 70 that is positioned adjacent the upper surface of the waveguide 16.

As before, the back-light assembly 60 here comprises an optical waveguide 16 that includes an upper, generally flat surface 18, a first side surface 20, a second side surface 22 and a specially configured lower surface 24 that is identical to the lower surface described in connection with the embodiment of FIGS. 3 and 4.

Like the embodiment in FIGS. 3 and 4, this third embodiment of the invention includes a plurality of spaced-apart micros-prisms 56 that are disposed proximate lower surface 24 of the waveguide 16 and are identical in construction and operation to the micro-prisms described in connection with the second embodiment of the invention.

Back-light assembly 60 also includes a light reflector panel 32 that is spaced-apart from the third facets 56c of the micro-prisms 56.

Disposed between reflector panel 32 and the third facets 56c is a plurality of transversely spaced-apart cold cathode fluorescent lamps 62 having side-mounted reflectors 64 (see FIG. 6).

As indicated in FIG. 5 of the drawings, certain of the light rays 36 that are generated by the light sources 62 enter into micro-prism from the light coupling third facets 56c. Additionally, depending on the angles that light rays 36 reflect from the upper surface of reflector panel 32 and enter into micro-prism from the light coupling third facets 56c. Inside of the micro-prisms 56 light rays propagate in X-axis direction by total internal reflections from facets 56a and 56c and enter the waveguide 16 from facets 28.

As before, inside the waveguide 16 light rays 36 propagate in the X-axis direction by total internal reflections from the major upper surface 18 and light-reflecting facets 26. As indicated in FIG. 2, certain of the upwardly inclined light-reflecting facets 26 cause the light rays to exit the waveguide. More particularly, the light rays exit the waveguide from the upper surface 18 when the light rays strike the upper surface at less than the critical angle.

As previously mentioned, an important feature of this latest form of the invention is the prism film 70 that is positioned adjacent the upper surface 18 of the waveguide. As has been seen in FIG. 5, prism film 70 is comprised of a planar upper surface 72 and a plurality alternating prismatic facets 74a and 74b that function to redirect the light exiting the waveguide 16 at an angle approximately perpendicular to the upper surface 72 of the prism film 70. Light directed towards the normal is most effective for display panels such as liquid crystal displays.

Having now described the invention in detail in accordance with the requirements of the patent statutes, those skilled in this art will have no difficulty in making changes and modifications in the individual parts or their relative assembly in order to meet specific requirement or conditions. Such changes and modification may be made without departing from the scope and spirit of the invention, as set forth in the following claims.

We claim:

1. A back-light assembly for uniformly illuminating a display comprising:
   (a) an optical waveguide for receiving and distributing light substantially by total internal reflections including:
       (i) an upper surface; and
       (ii) a lower surface having a plurality of upwardly inclined light-reflecting facets and a plurality of downwardly inclined facets; and
       (iii) a plurality of spaced-apart micro-prisms, each said micro-prism having a first facet disposed proximate and substantially parallel to a selected one of said upwardly inclined light-reflecting facets of said lower surface, a second facet disposed proximate and substantially parallel to a selected one of said downwardly inclined facets of said lower surface and a light coupling third facet interconnecting said first and second facets, and
   (b) a plurality of transversely spaced-apart light sources located proximate said lower surface of said optical waveguide emitting light generally in the same direction.

2. The assembly as defined in claim 1, further including a light reflector spaced-apart from said lower surface of said optical waveguide, said plurality of light sources being disposed between said lower surface of said waveguide and said light reflector.

3. The assembly as defined in claim 1 in which said upwardly inclined light-reflecting facets of said lower surface of said waveguide extend upwardly at an angle of between two degrees and about fifteen degrees with respect to said upper surface of said optical waveguide.

4. The assembly as defined in claim 1 in which said downwardly inclined facets of said lower surface of said waveguide extend downwardly at an angle of between about fifty degrees and about ninety degrees with respect to said upper surface of said optical waveguide.

5. The assembly as defined in claim 1 in which said transversely spaced-apart light sources comprises light emitting diodes.

6. The assembly as defined in claim 1 in which said transversely spaced-apart light sources comprises cold cathode fluorescent lamps.

7. The assembly as defined in claim 1 in which said light-reflecting facets have light reflecting surfaces.

8. The assembly as defined in claim 1 in which each of said micro-prisms of said plurality of spaced-apart micro-prisms of said optical waveguide is formed from a polymer.

9. The assembly as defined in claim 1 further comprising a reflector disposed adjacent each of said light sources for reflecting light emitted from said light sources towards a selected one of said light coupling third facets.

10. A back-light assembly for uniformly illuminating a display comprising:
    (a) an optical waveguide for receiving and distributing light substantially by total internal reflections including:
        (i) an upper surface; and
        (ii) a lower surface having a plurality of upwardly inclined light-reflecting facets extending upwardly at an angle of between about two degrees and about fifteen degrees with respect to said upper surface of said optical waveguide and a plurality of downwardly inclined facets extending downwardly at an angle of between about fifty degrees and about ninety degrees with respect to said upper surface of said optical waveguide; and
        (iii) a plurality of spaced-apart micro-prisms, each said micro-prism having a first facet disposed proximate and substantially parallel to a selected one of said upwardly inclined light-reflecting facets of said lower surface, a second facet disposed proximate and substantially parallel to a selected one of said downwardly inclined facets of said lower surface and a light coupling third facet interconnecting said first and second facets, and
    (b) a reflector disposed proximate said lower surface of said optical waveguide; and
    (c) a plurality of transversely spaced-apart light sources located between said reflector and said lower surfaces of said optical waveguide.

11. The assembly as defined in claim 10 in which said transversely spaced-apart light sources comprises light emitting diodes.

12. The assembly as defined in claim 10 in which said transversely spaced-apart light sources comprises cold cathode fluorescent lamps.

13. The assembly as defined in claim 10 further comprising a reflector disposed adjacent each of said light sources for reflecting light emitted from said light sources toward a selected one of said light coupling third facets.

14. The assembly as defined in claim 10 further including a prism film positioned proximate said upper surface of said waveguide for redirecting light exiting said waveguide at an angle approximately perpendicular to said upper surface thereof.

15. A backlight assembly for uniformly illuminating a display comprising:
    (a) an optical waveguide for receiving and distributing light substantially by total internal reflections including:
        (i) an upper surface; and
        (ii) a lower surface having a plurality of upwardly inclined light-reflecting facets and a plurality of downwardly inclined facets; and
        (iii) a plurality of spaced-apart micro-prisms, each said micro-prism having a first facet disposed proximate and substantially parallel to a selected one of said upwardly inclined light-reflecting facets of said lower surface, a second facet disposed proximate and substantially parallel to a selected one of said downwardly inclined facets of said lower surface and a light coupling third facet interconnecting said first and second facets; and
    (b) a plurality of transversely spaced-apart light sources located proximate said lower surface of said optical waveguide;
    wherein most light rays entering from said third facet of each said micro-prisms collimate and propagate by total internal reflections from said first and said third facets of each said micro-prisms and enter said optical waveguide from selected one of said downwardly inclined facets of said lower surface of said waveguide.

16. The assembly as defined in claim 15 further including a prism film positioned proximate said upper surface of said waveguide for redirecting light exiting said waveguide at an angle approximately perpendicular to said upper surface thereof.

17. The assembly as defined in claim 15 in which said transversely spaced-apart light sources comprises cold cathode fluorescent lamps.

18. The assembly as defined in claim 15 in which said transversely spaced-apart light sources comprises light emitting diodes.

19. The assembly as defined in claim 15, further including a light reflector spaced-apart from said lower surface of said optical waveguide, said plurality of light sources being disposed between said lower surface of said waveguide and said light reflector.

\* \* \* \* \*